(12) United States Patent
Balderson

(10) Patent No.: US 10,766,161 B2
(45) Date of Patent: Sep. 8, 2020

(54) VERTICAL GRAIN SAWMILL AND METHOD OF SAWING VERTICAL GRAIN LUMBER

(71) Applicant: Bo Fisher, Horseshoe Bend, ID (US)

(72) Inventor: Harold Balderson, Council, ID (US)

(*) Notice: Subject to any disclaimer, the term of this patent is extended or adjusted under 35 U.S.C. 154(b) by 0 days.

(21) Appl. No.: 16/103,778

(22) Filed: Aug. 14, 2018

(65) Prior Publication Data

US 2019/0047170 A1     Feb. 14, 2019

Related U.S. Application Data

(60) Provisional application No. 62/545,108, filed on Aug. 14, 2017.

(51) Int. Cl.

| | |
|---|---|
| *B27B 7/02* | (2006.01) |
| *B23D 45/10* | (2006.01) |
| *B23D 59/00* | (2006.01) |
| *B27B 29/04* | (2006.01) |
| *B27B 31/00* | (2006.01) |

(52) U.S. Cl.
CPC .............. *B27B 7/02* (2013.01); *B23D 45/10* (2013.01); *B23D 59/001* (2013.01); *B27B 29/04* (2013.01); *B27B 31/00* (2013.01)

(58) Field of Classification Search
CPC .......... B27B 1/00; B27B 1/002; B27B 1/005; B27B 1/007; B27B 29/08; B27B 29/085; B27B 31/04
See application file for complete search history.

(56) References Cited

U.S. PATENT DOCUMENTS

| | | | | |
|---|---|---|---|---|
| 5,109,899 A | * | 5/1992 | Henderickson | ...... B23D 45/027 144/378 |
| 5,135,037 A | * | 8/1992 | Wijesinghe | ........... B27B 29/085 144/215.2 |

* cited by examiner

*Primary Examiner* — Matthew Katcoff
(74) *Attorney, Agent, or Firm* — Shaver & Swanson, LLP; Scott D. Swanson

(57) ABSTRACT

What is disclosed is an improved method of sawing wood and an improved sawmill capable of producing vertical grain lumber. Vertical grain lumber is a preferred lumber for use, for example, in trim applications. The improved method and improved sawmill both utilize a track having a carriage, the carriage has a vertical blade and a horizontal blade. The vertical blade and the horizontal blade travel on the carriage down the track. The log is then rotated for another length of lumber to be cut. In a preferred embodiment the sawmill utilizes a skewer for adjusting the log. In a preferred embodiment the log is held by a lathe that can be moved. In a preferred embodiment the log is placed on a skewer before it is engaged by the lathe.

20 Claims, 13 Drawing Sheets

VERTICAL GRAIN SAWMILL AND METHOD OF SAWING VERTICAL GRAIN LUMBER

PRIORITY/CROSS-REFERENCE TO RELATED APPLICATIONS

This application claims the benefit of U.S. Provisional Application No. 62/545,108, filed Aug. 14, 2017, the disclosure of which is incorporated by reference.

TECHNICAL FIELD

The disclosure generally relates to the field of sawmills and processes of cutting lumber. Particular embodiments relate to a new and improved sawmill for cutting vertical grain lumber.

BACKGROUND

Vertical grain lumber traditionally has been made by a variety of processes, with likely the most well-known processing being quarter sawing. The quarter sawn process is well known in the art. However, the quarter sawn process is generally laborious and generates a significant amount of non-vertical grain lumber byproduct. Accordingly, what is needed is a process of producing lumber with vertical grain in a more efficient manner.

Vertical grain lumber is traditionally used, for example, as wood for musical instruments such as guitars and for trim work in the construction industry. For example, trim including window and door casings, crown, and baseboard trim are all preferably made out of quarter sawn lumber when a natural wood look is desired.

Vertical grain lumber is typically more desirable and more expensive than flat sawn lumber as a typical log will yield more useable flat sawn lumber than vertical grain lumber. Vertical grain also tends to hold paint and stain better than flat sawn wood, or wood that is sawn with the annual growth ring parallel to the face of the board.

SUMMARY OF THE DISCLOSURE

The purpose of the Summary is to enable the public, and especially the scientists, engineers, and practitioners in the art who are not familiar with patent or legal terms or phraseology, to determine quickly from a cursory inspection, the nature and essence of the technical disclosure of the application. The Summary is neither intended to define the inventive concept(s) of the application, which is measured by the claims, nor is it intended to be limiting as to the scope of the inventive concept(s) in any way.

What is disclosed is a method of cutting vertical grain lumber comprising the following steps: the step of providing a sawmill configured to cut a log into a plurality of boards in a lengthwise manner. The sawmill comprises a rotational mechanism for holding and rotating a log and a cutting mechanism for cutting a vertical grain board from the log; the step of positioning a log in a first position in the rotational mechanism; the step of cutting at least one vertical grain board from the log in a first position; the step of rotating the log to a second position; and the step of cutting at least one vertical grain board from the log in a second position.

In a preferred embodiment, the rotational mechanism for holding and rotating a log comprises a lathe and the lathe comprises a ratchet and pawl mechanism for arresting rotation of the lathe. In a preferred embodiment, the cutting mechanism comprises a track and carriage, and the track and carriage are oriented such that the track and carriage run generally parallel to the lengthwise vector of a log when a log is held by the rotational mechanism. The cutting mechanism comprises a vertical blade and two generally parallel horizontal blades. The vertical blade is generally oriented at a 90 degree angle to each horizontal blade. In a preferred embodiment, the vertical blade is positioned generally perpendicular to an axis of travel of the carriage, wherein the horizontal blades are positioned generally parallel to the axis of travel of the carriage.

In a preferred embodiment, the carriage is configured to travel along the track in a direction parallel to the lengthwise orientation of a log positioned in the rotational mechanism and the blades are configured to cut the log as the carriage moves along the track. The blades are configured in a generally u-shape so as to cut generally square and/or rectangular vertical grain boards from the log. In a preferred embodiment, the blades are driven by circular saw blades and the carriage is configured to be laterally adjustable in relation to the track so as to alter the orientation of the blades in relation to a center of a log positioned in the rotational mechanism.

In a preferred embodiment, the method of cutting vertical grain lumber further comprises the additional steps of rotating the log into six subsequent positions and cutting vertical grain boards at each of six subsequent positions, wherein the method results in an octagonal core remaining of the log after vertical grain boards have been cut. In a preferred embodiment, the sawmill carriage and blades are driven by a gas and/or electric motor.

In a further preferred embodiment, the cutting mechanism comprises a track and carriage, wherein the track and carriage are oriented such that the track and carriage run generally parallel to the lengthwise vector of a log when a log is held by the rotational mechanism. The cutting mechanism comprises a vertical blade and a horizontal blade, wherein the vertical blade is generally oriented at a 90 degree angle to the horizontal blade. The carriage is configured to travel along the track in a direction parallel to the lengthwise orientation of a log positioned in the rotational mechanism, and the blades are configured to cut the log as said carriage moves along the track. The horizontal blade and vertical blade are oriented to cut a board from a log having the natural bark and/or exterior of a log. In a preferred embodiment, the method comprises the step of cutting the bark and/or exterior of the log from the board to obtain a generally square or rectangular board.

What is further disclosed is a sawmill comprising a lathe configured to hold a log on a lengthwise axis of the log. The sawmill comprises a track oriented in relation to the lathe to travel along the lengthwise axis of the log when engaged by the lathe. The sawmill further comprises a carriage configured to travel along the rail. The carriage comprises two horizontal blades and a vertical blade which are configured to cut the log into vertical grain boards. In a preferred embodiment, the sawmill further comprises a skewer which is configured to adjust a log on an x-axis and/or a y-axis to orient the log or position it on the lathe. The sawmill further comprises a video positioning system. In a preferred embodiment, the carriage comprises a second vertical blade configured to cut boards from a log in rectangular or square shapes.

DETAILED DESCRIPTION OF THE EXEMPLARY EMBODIMENTS

Figure 1:
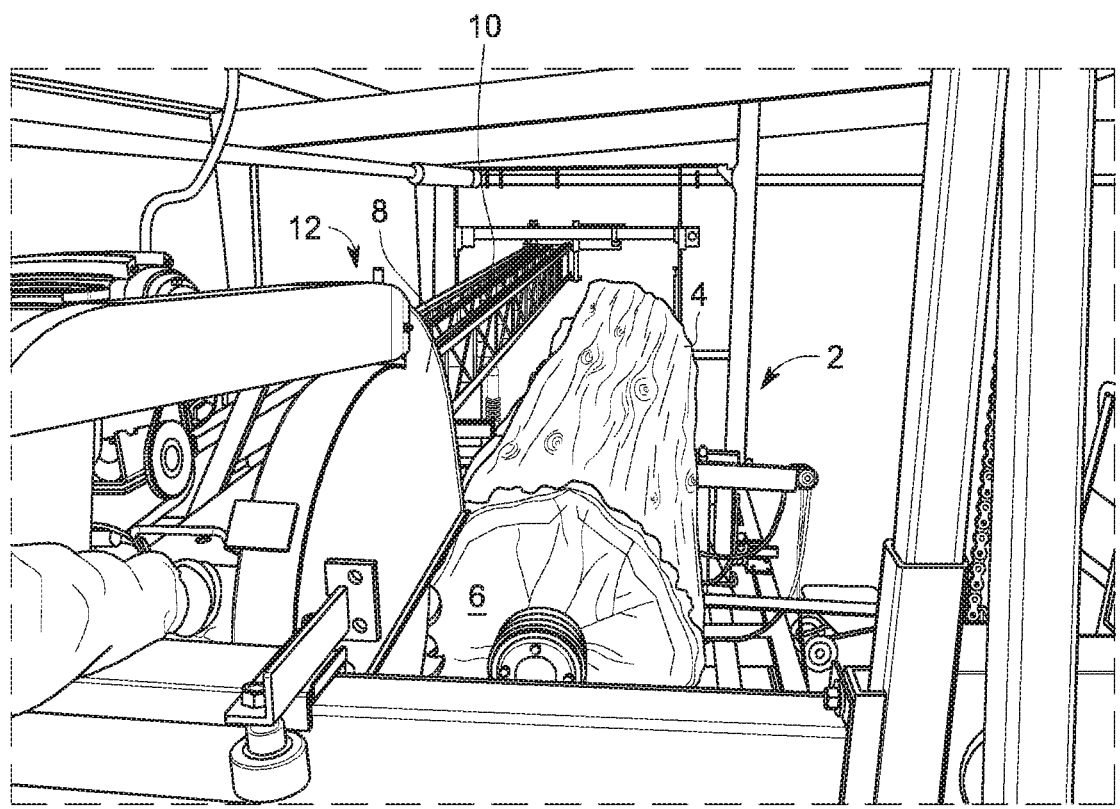
FIG. 1 is a perspective view of an improved sawmill.

While the presently disclosed inventive concept(s) is susceptible of various modifications and alternative constructions, certain illustrated embodiments thereof have been shown in the drawings and will be described below in detail. It should be understood, however, that there is no intention to limit the inventive concept(s) to the specific form disclosed, but, on the contrary, the presently disclosed and claimed inventive concept(s) is to cover all modifications, alternative constructions, and equivalents falling within the spirit and scope of the inventive concept(s) as defined herein.

In the following description and in the figures, like elements are identified with like reference numerals. The use of "e.g.," "etc," and "or" indicates non-exclusive alternatives without limitation unless otherwise noted. The use of "including" means "including, but not limited to," unless otherwise noted.

FIG. 1 illustrates an improved sawmill 2 capable of cutting lumber so as to produce vertical grain lumber FIG. 1 illustrates a log 4 placed in the improved sawmill. The log is held in place in the sawmill by a lathe 6. A vertical blade 8 on a carriage 12 is utilized to make vertical cuts along the log as the carriage 12 travels down the track 10.

Figure 2:
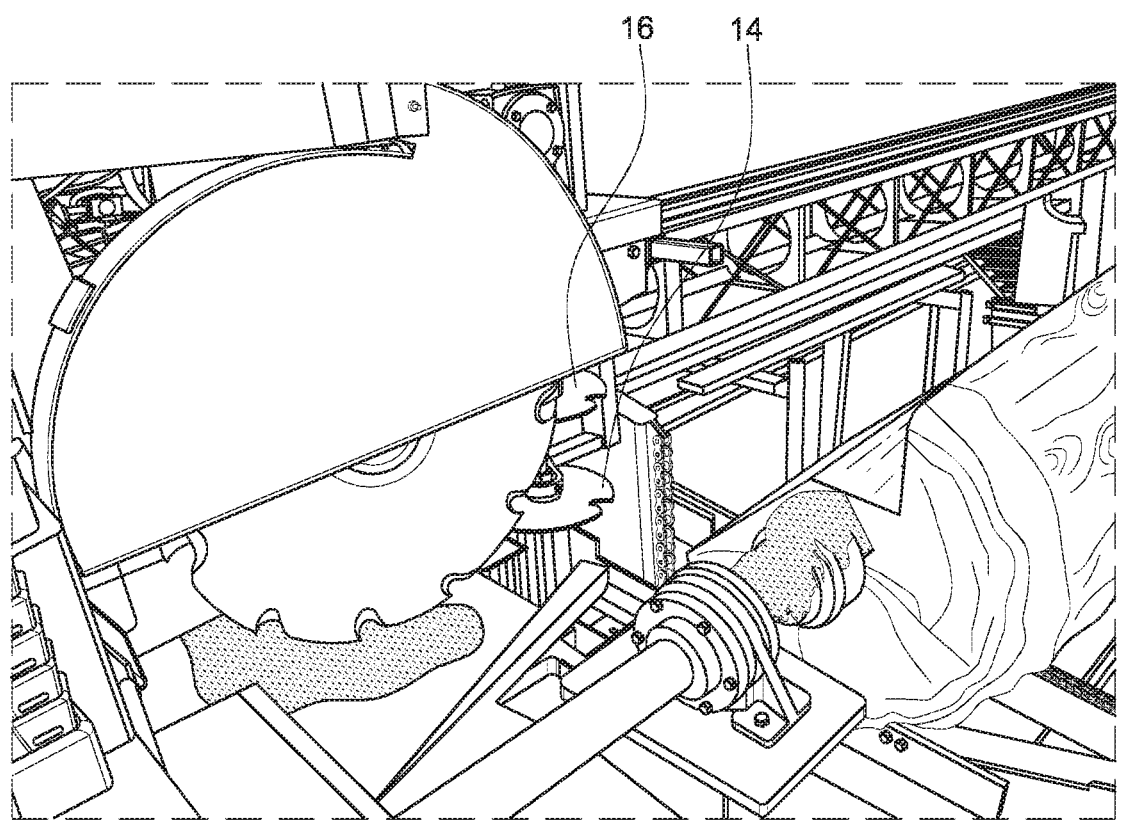
FIG. 2 is a perspective view of a carriage of an improved sawmill showing cutting blades attached to the carriage.

FIG. 2 illustrates two horizontal blades 14, 16 that are utilized in conjunction with the vertical blade in order to cut sections of lumber from the log. As the carriage travels down the track the circular blades are driven to rotate and cut boards from the log. The closer to the vertical center of the log that the vertical blade is the more vertical grain orientation each board will have. Thus the vertical grain lumber is obtained by cutting boards whose face is as close to perpendicular to a vertical line drawn extending directly upward from the center of the log.

Figure 3:
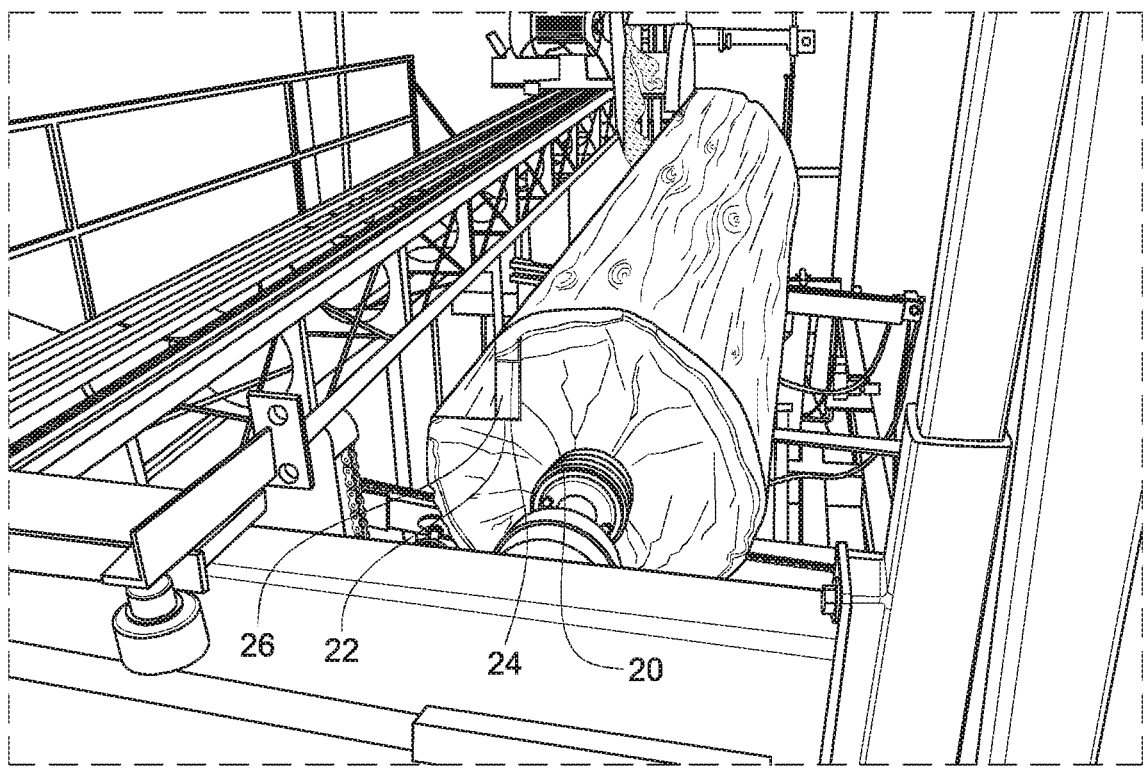
FIG. 3 is a perspective view of an improved sawmill showing a log being sawn to produce a board exhibiting vertical grain.
Figure 8:
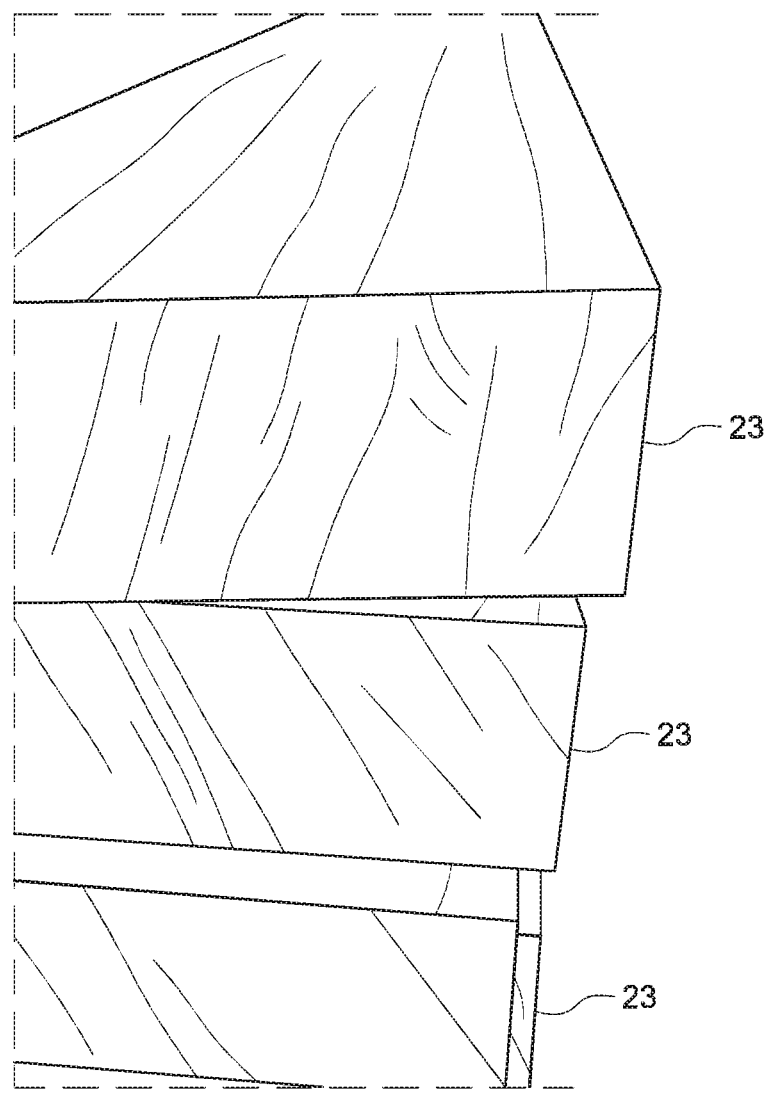
FIG. 8 is a side perspective illustration of lumber attained utilizing embodiments of the method and/or apparatus described herein.

FIG. 3 illustrates a position in the process of cutting vertical grain lumber at which the carriage has traveled down the track thus making a vertical cut 20 and two horizontal cuts 22, 24 in the lumber. This leaves a board 26 that is generally of vertical grain. In this process vertical grain lumber having annual growth rings of the tree (log) that is being sawn are vertical to the face of the board. The face of the board is typically defined as the elongate section of a rectangular board, while two opposing sides of a square board would be considered to be opposing faces of a square board. For example, in a 2×6 board, the 6 represents the face of the board whereas the 2 indicates the narrower aspect of the board. The vertical grain lumber generally has the growth ring vertical to the face of the board as shown in FIG. 8.

Figure 4:
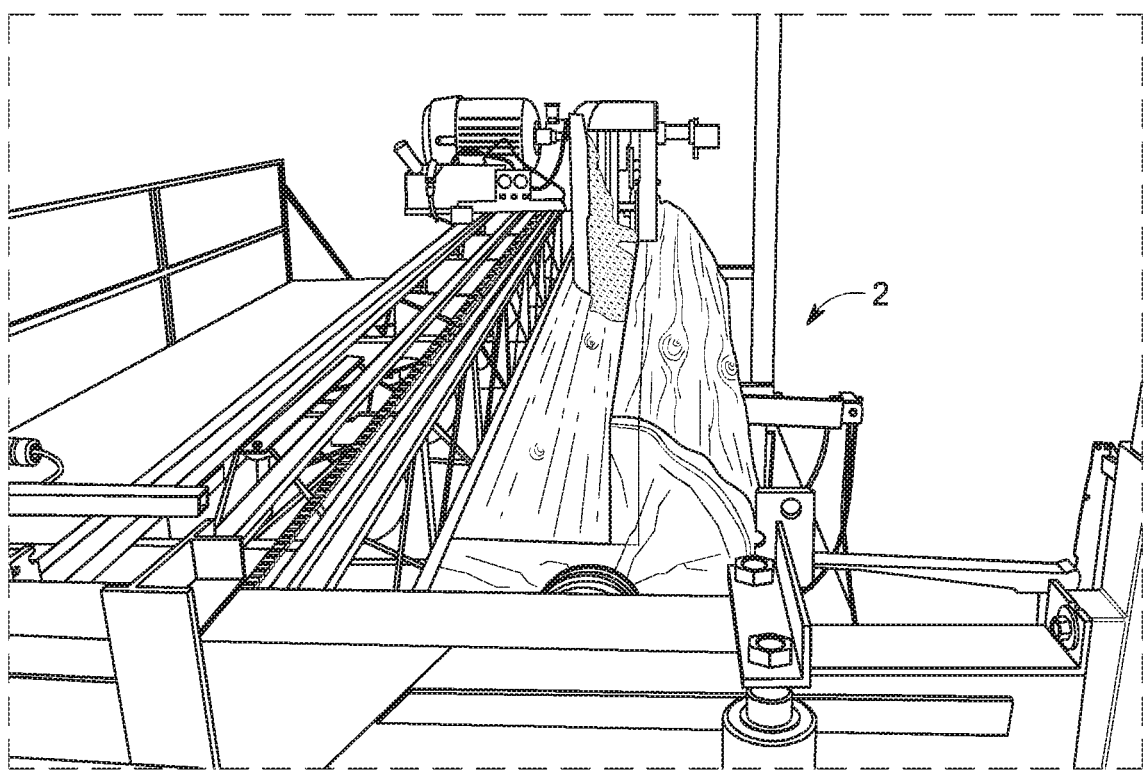
FIG. 4 is a perspective view of an improved sawmill showing a log being sawn to produce a subsequent board exhibiting vertical grain.
Figure 5:
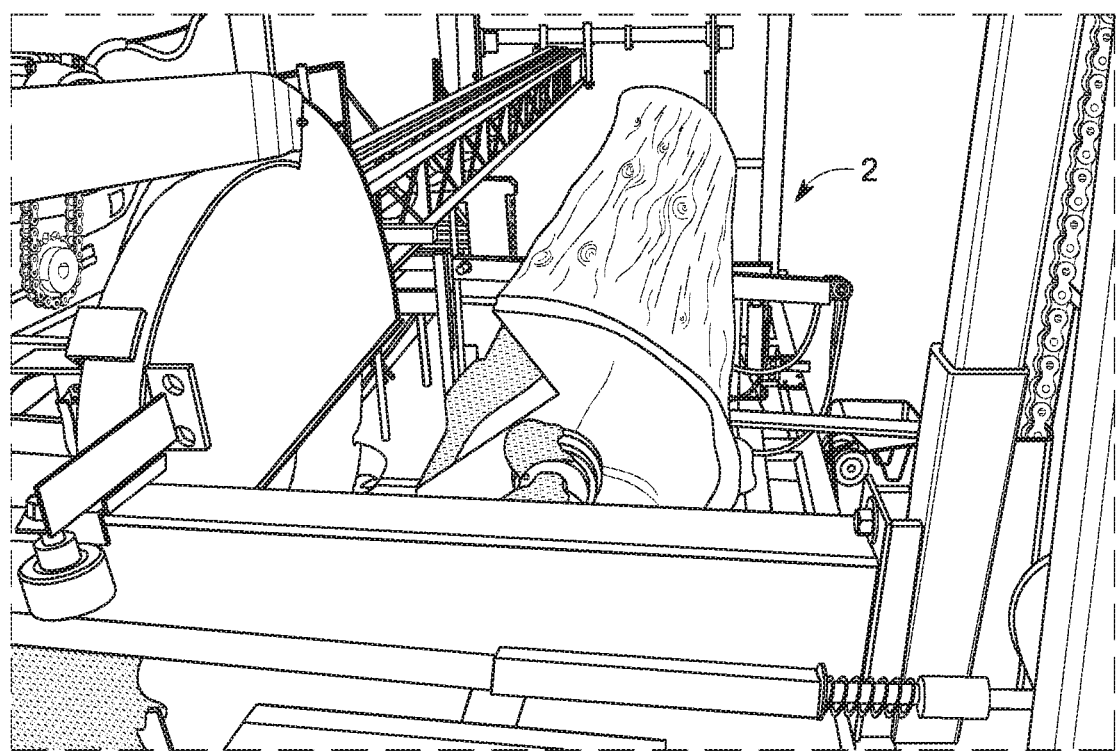
FIG. 5 is a perspective view of an improved sawmill showing a log being rotated from the position of FIG. 1 to a second position at which further boards exhibiting vertical grain can be cut.
Figure 6:
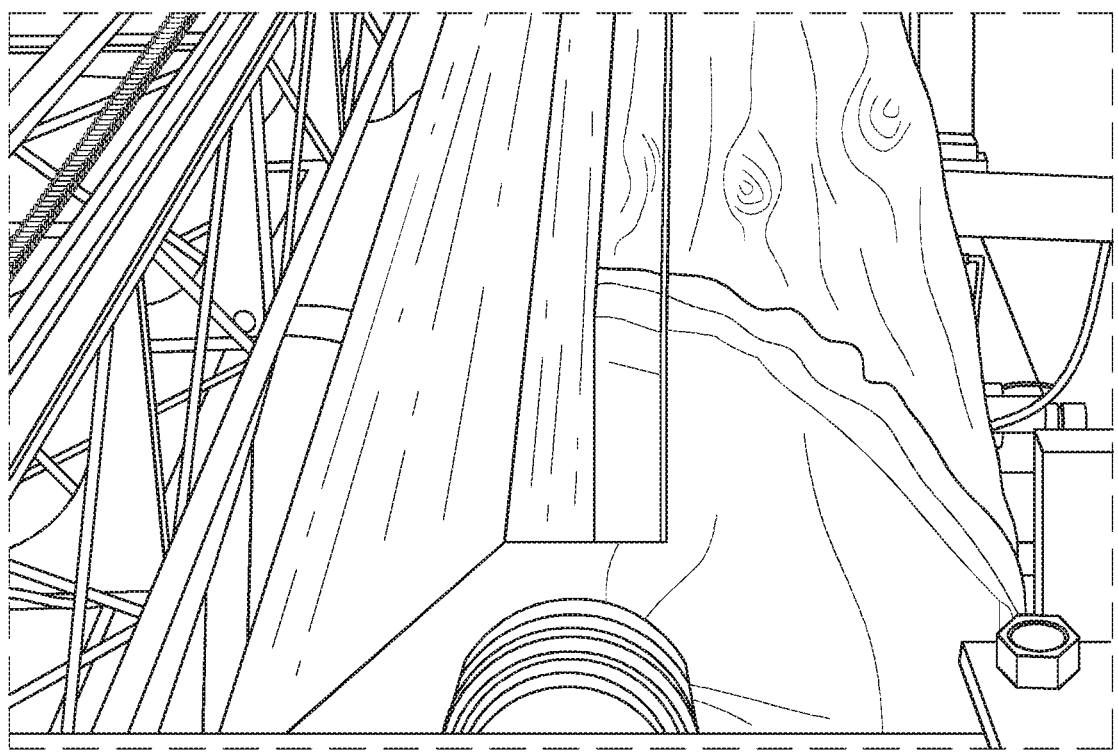
FIG. 6 is a perspective view of an improved sawmill showing a log in a second position being sawn to produce a board exhibiting vertical grain.
Figure 7:
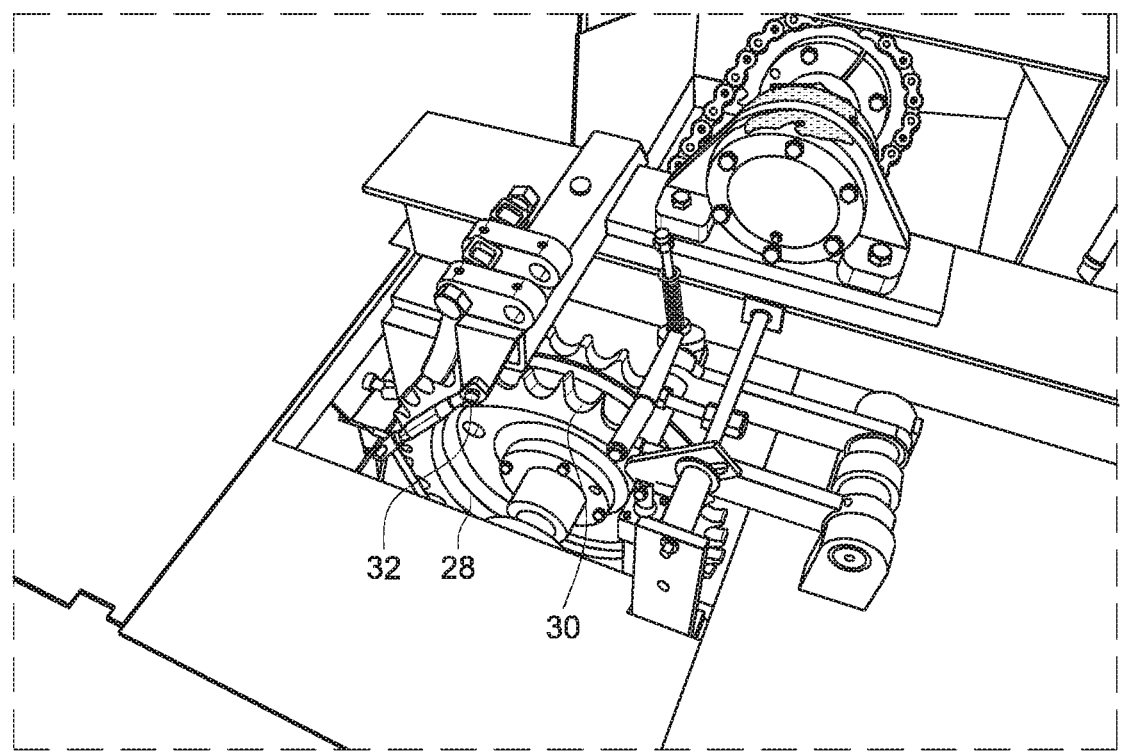
FIG. 7 is a perspective view of the rotational mechanism of the improved sawmill having a ratchet and pawl mechanism for arresting rotation of the log.

Following the completion of the cutting of the board 26, the carriage and associated blades are returned to the starting point shown in FIGS. 1 and 2. The lathe and the piece of lumber can then either be moved to the left or the carriage and track move to the right. This allows for a second cut to be made of vertical grain at the same orientation of the log in the lathe. FIG. 4 illustrates the continuing cutting of logs moving to the right in the picture. Once a number of boards have been cut such that the vertical grain is no longer being cut, the lathe is then used to rotate the log as shown in FIG. 5. FIG. 5 illustrates the log rotating in a counter clockwise direction. The carriage and blades are then utilized to cut off a generally triangular shape piece of wood, which can be discarded or used in a alternative lumber use.

After the log has been rotated and the triangular section removed, the carriage and associated blades are then utilized to cut further vertical grain boards in the new position of the log. A subsequent vertical grain board is shown 23. The log can be continued to be rotated and cut by the sawmill until all the vertical grain sections have been removed. This will leave an octagonal shaped core of the log. This octagonal shaped core can then be utilized for subsequent lumber processes.

What is further disclosed is a process of manufacturing of vertical grain board. Process includes the step of placing a log into a lathe. The process involves the step of cutting a series of vertical grain boards from the log in a first position in the lathe. After the log is then rotated to a second position at which further vertical grain boards can be cut from the log. The process can involve the steps of continuing to rotate the log to subsequent positions at which vertical grain lumber can be cut. In a preferred embodiment, the lathe rotates the log from a first point to a second point and retains the log at a second point in a second position via a ratchet and detent mechanism. This ratchet and detent mechanism prevents the log from rotating in either direction while the carriage and associated saws travel along a rail thus cutting boards.

Figure 9:
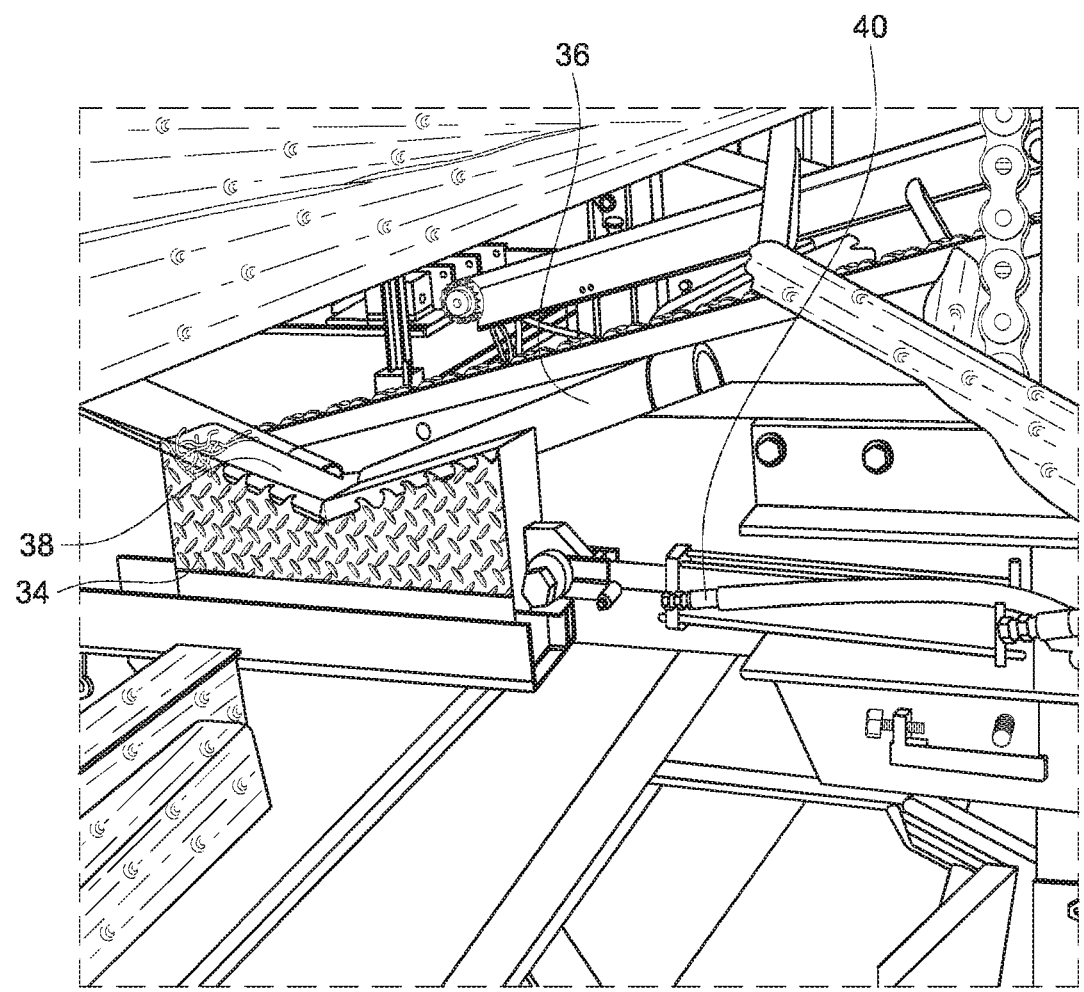
FIG. 9 is a perspective view of a chuck of an embodiment of the invention.
Figure 10:
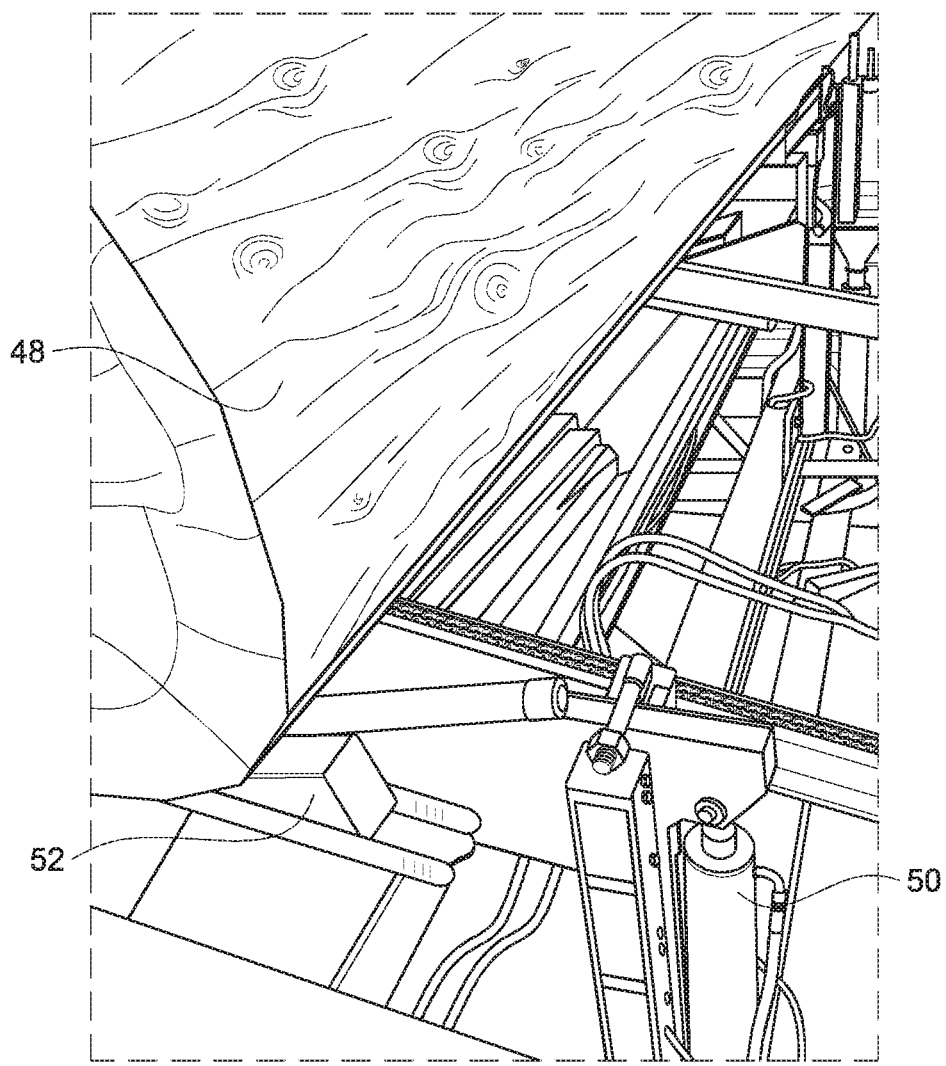
FIG. 10 is a perspective view of an embodiment of a chuck of a preferred embodiment of the invention with a log to be sawn placed on the chuck.

FIG. 9 illustrates a perspective view of an embodiment of a chuck according to an embodiment of the described concepts. The chuck includes supports 36, 38 for supporting a log to be sawn. The log can be moved on an x-axis and a y-axis. In a preferred embodiment a hydraulic mechanism 40 moves the chuck on the x-axis. A second hydraulic mechanism 50 moves the skewer on the y-axis, this hydraulic system is shown in FIG. 10. One or more hydraulic jacks or presses can be utilized for each hydraulic mechanism. This allows a log to be centered and subsequently rotated to be sawn. FIG. 10 illustrates a log 48 placed on the skewer 52. Alternatively, the skewer can have grasping mechanisms to grab the log or otherwise provide for further friction to the mechanism. FIG. 10 illustrates one of the hydraulic lifts 50 moving the log on the y-axis.

Figure 11:
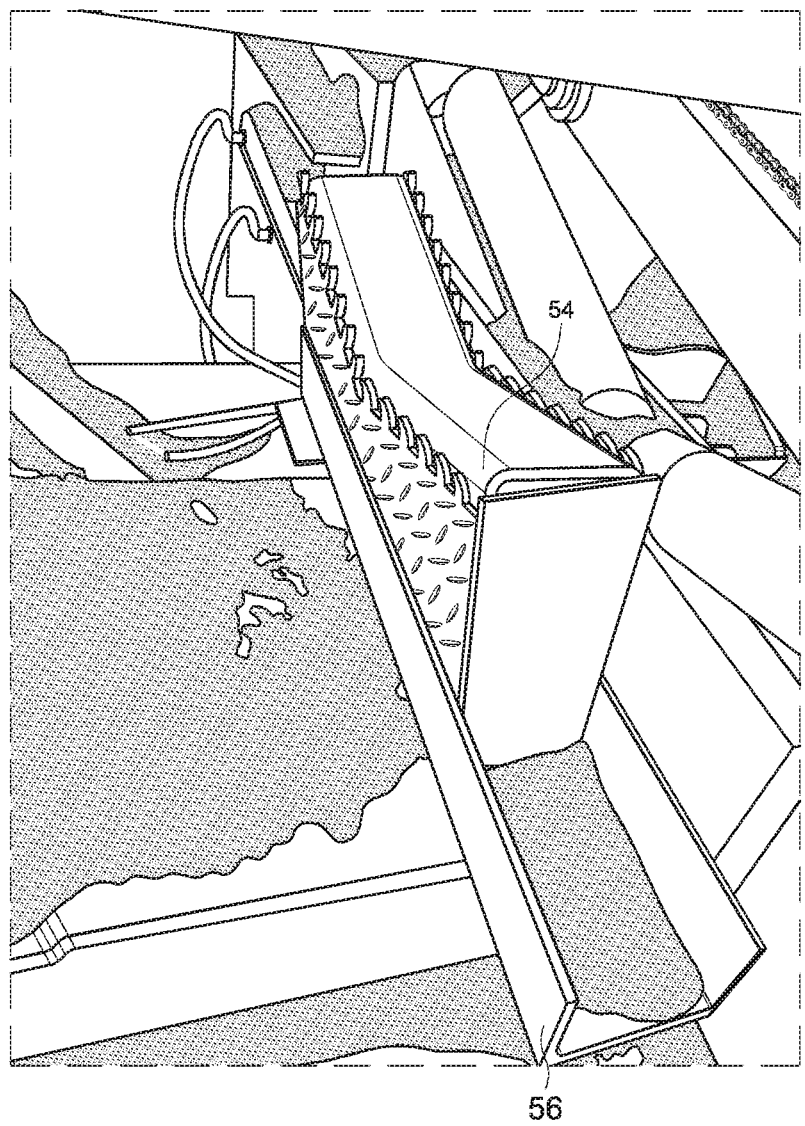
FIG. 11 is a side view of an embodiment of a chuck of a preferred embodiment of the invention.

FIG. 11 illustrates a side perspective view of the skewer 54. The skewer can move horizontally in a preferred embodiment in a track 56.

Figure 12:
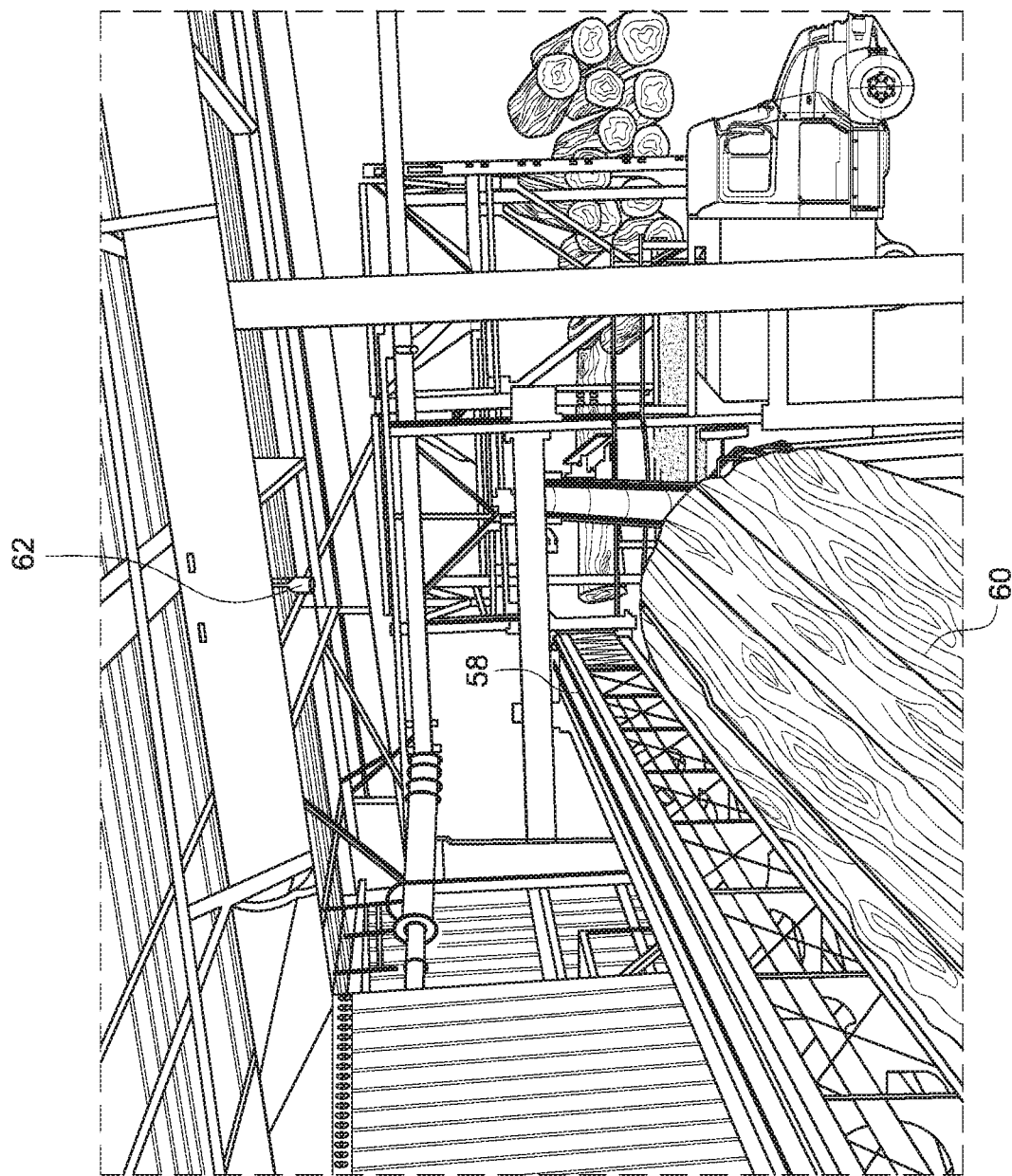
FIG. 12 is a perspective view of a control for a chuck of a preferred embodiment of the invention.

FIG. 12 illustrates a preferred embodiment of the system including the end of the track 58. Positioned above the sawmill is a camera 62 positioned to view the end of the log in relation to the sawmill. This allows the operator to view the end of the log remotely while operating the skewer to adjust the log.

Figure 13:
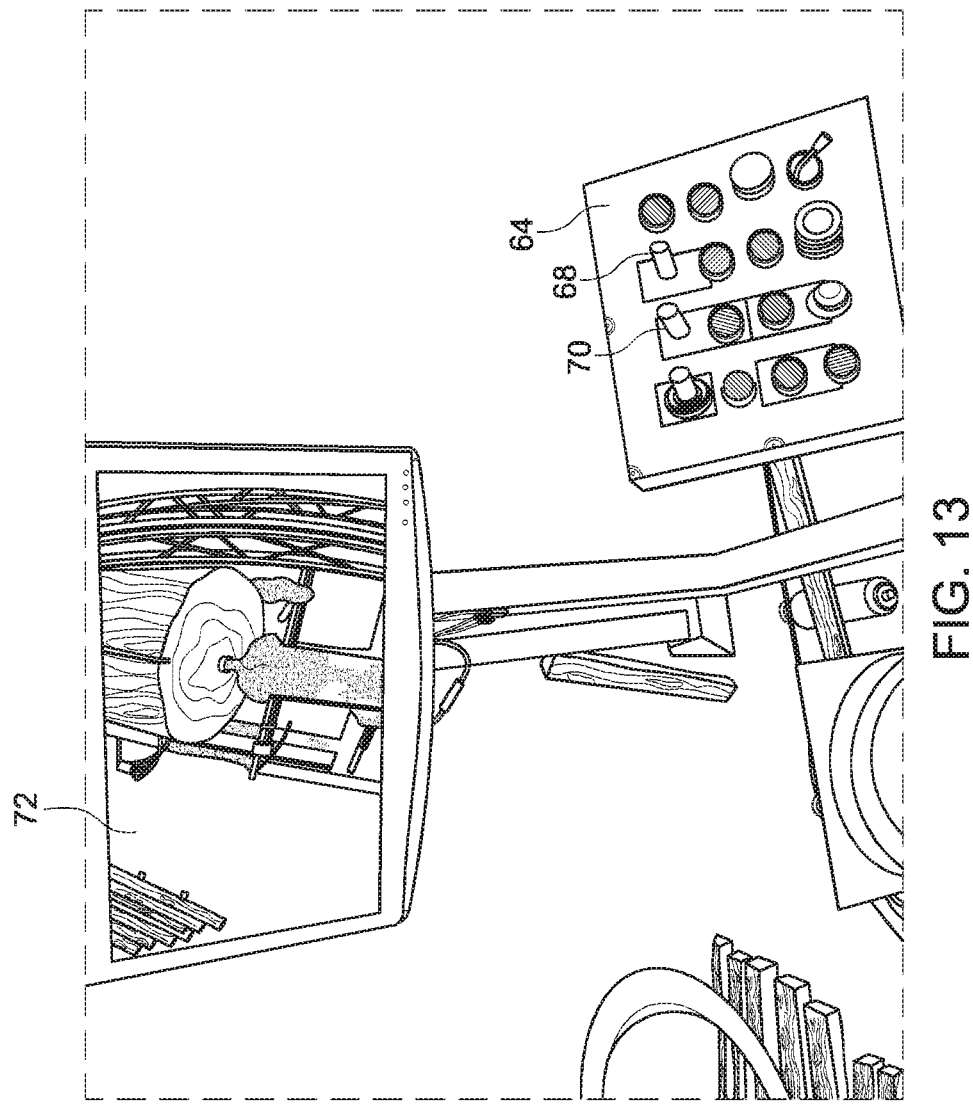
FIG. 13 is a view of a video display system for controlling the chuck of a preferred embodiment of the invention and displaying the position of the chuck relative to the sawmill.

FIG. 13 shows a display for displaying an image from the camera or other sensor of FIG. 12. FIG. 13 similarly shows the control mechanism for controlling the skewer of the system. The control includes in a preferred embodiment joystick 68, 70 controlling the skewer. The control system 64 for the entire sawmill can be located on the control panel depicted or it can be on a separate control panel or elsewhere.

Still other features and advantages of the presently disclosed and claimed inventive concept(s) will become readily apparent to those skilled in this art from the following detailed description describing preferred embodiments of the inventive concept(s), simply by way of illustration of the best mode contemplated by carrying out the inventive concept(s). As will be realized, the inventive concept(s) is capable of modification in various obvious respects all without departing from the inventive concept(s). Accordingly, the drawings and description of the preferred embodiments are to be regarded as illustrative in nature, and not as restrictive in nature.

While certain exemplary embodiments are shown in the Figures and described in this disclosure, it is to be distinctly understood that the presently disclosed inventive concept(s) is not limited thereto but may be variously embodied to practice within the scope of this disclosure. From the foregoing description, it will be apparent that various changes may be made without departing from the spirit and scope of the disclosure as defined herein.

I claim:

1. A method of cutting vertical grain lumber, where said method comprises the following steps:
    the step of providing a sawmill, wherein said sawmill is configured to cut a log into a plurality of boards in a lengthwise manner, wherein said sawmill comprises a rotational mechanism for holding and rotating a log, wherein said sawmill comprises a cutting mechanism for cutting a vertical grain board from said log, wherein said rotational mechanism for holding and rotating a log comprises a lathe, wherein said lathe comprises a ratchet and pawl mechanism for arresting rotation of said lathe;
    the step of positioning a log in a first position in said rotational mechanism for holding and rotating a log;
    the step of cutting at least one vertical grain board from said log in said first position;
    the step of rotating said log to a second position;
    the step of cutting at least one vertical grain board from said log in said second position.

2. The method of claim 1, wherein said cutting mechanism comprises a track and carriage, wherein said track and carriage are oriented such that said track and carriage run generally parallel to the lengthwise vector of a log when a log is held by said rotational mechanism, wherein said cutting mechanism comprises a vertical blade and two generally parallel horizontal blades, wherein said vertical blade is generally oriented at a 90 degree angle to each horizontal blade, wherein said carriage is configured to travel along said track in a direction parallel to the lengthwise orientation of a log positioned in said rotational mechanism, wherein said blades are configured to cut said log as said carriage moves along said track, wherein said blades are configured in a generally u-shape so as to cut generally square and/or rectangular vertical grain boards from said log.

3. The method of claim 2, wherein said blades are driven circular saw blades.

4. The method of claim 3, wherein said carriage is configured to be laterally adjustable in relation to said track so as to alter the orientation of said blades in relation to a center of a log positioned in said rotational mechanism.

5. The method of claim 1, wherein said method further comprises the additional steps of rotating said log into six subsequent positions and cutting vertical grain boards have been cut at each of said six subsequent positions, wherein said method results in an octagonal core remaining of said log after vertical grain boards.

6. The method of claim 2, wherein said sawmill carriage and blades are driven by a powered motor.

7. The method of claim 2, wherein said vertical blade is positioned generally perpendicular to an axis of travel of said carriage, wherein said horizontal blades are positioned generally parallel to said axis of travel of said carriage.

8. The method of claim 1, wherein said cutting mechanism comprises a track and carriage, wherein said track and carriage are oriented such that said track and carriage run generally parallel to the lengthwise vector of a log when a log is held by said rotational mechanism, wherein said cutting mechanism comprises a vertical blade and a horizontal blade, wherein said vertical blade is generally oriented at a 90 degree angle to said horizontal blade, wherein said carriage is configured to travel along said track in a direction parallel to the lengthwise orientation of a log positioned in said rotational mechanism, wherein said blades are configured to cut said log as said carriage moves along said track, wherein said horizontal blade and said vertical blade are oriented to cut a board from said log exterior;
    wherein said method comprises the step of cutting the exterior of said log from said board to obtain a generally square or rectangular board.

9. A sawmill, said sawmill comprising a lathe configured to hold a log on a lengthwise axis of said log;
    A track, said track oriented in relation to said lathe to travel along said lengthwise axis of said log when engaged by said lathe;
    A carriage, said carriage configured to travel along said rail wherein said carriage comprises two horizontal blades and a vertical blade said blades configured to cut said log into vertical grain boards;
    wherein said sawmill comprises a video positioning system.

10. The sawmill of claim 9 wherein said sawmill comprises a skewer, wherein said skewer is configured to orient said log on an x-axis and a y-axis to orient said log or position on said lathe.

11. The sawmill of claim 9 wherein said sawmill comprises a skewer wherein said skewer is configured to adjust the position of a log on an x-axis.

12. The sawmill of claim 9 wherein said sawmill comprises a skewer wherein said skewer is configured to adjust the position of a log on a y-axis.

13. The sawmill of claim 9 wherein said carriage comprises a second vertical blade wherein the blades of said carriage are configured to cut boards from a log in rectangular or square shapes.

14. A method of cutting vertical grain lumber, where said method comprises the following steps:

the step of providing a sawmill, wherein said sawmill is configured to cut a log into a plurality of boards in a lengthwise manner, wherein said sawmill comprises a rotational mechanism for holding and rotating a log, wherein said sawmill comprises a cutting mechanism for cutting a vertical grain board from said log;

the step of positioning a log in a first position in said rotational mechanism for holding and rotating a log;

the step of cutting at least one vertical grain board from said log in said first position;

the step of rotating said log to a second position;

the step of cutting at least one vertical grain board from said log in said second position;

the step of rotating said log into six subsequent positions and cutting vertical grain boards have been cut at each of said six subsequent positions, wherein said method results in an octagonal core remaining of said log after vertical grain boards.

15. The method of claim 14, wherein said rotational mechanism for holding and rotating a log comprises a lathe.

16. The method of claim 14, wherein said cutting mechanism comprises a track and carriage, wherein said track and carriage are oriented such that said track and carriage run generally parallel to the lengthwise vector of a log when a log is held by said rotational mechanism, wherein said cutting mechanism comprises a vertical blade and two generally parallel horizontal blades, wherein said vertical blade is generally oriented at a 90 degree angle to each horizontal blade, wherein said carriage is configured to travel along said track in a direction parallel to the lengthwise orientation of a log positioned in said rotational mechanism, wherein said blades are configured to cut said log as said carriage moves along said track, wherein said blades are configured in a generally u-shape so as to cut generally square and/or rectangular vertical grain boards from said log.

17. The method of claim 16, wherein said blades are driven circular saw blades.

18. The method of claim 17, wherein said carriage is configured to be laterally adjustable in relation to said track so as to alter the orientation of said blades in relation to a center of a log positioned in said rotational mechanism.

19. The method of claim 17, wherein said vertical blade is positioned generally perpendicular to an axis of travel of said carriage, wherein said horizontal blades are positioned generally parallel to said axis of travel of said carriage.

20. The method of claim 14, wherein said cutting mechanism comprises a track and carriage, wherein said track and carriage are oriented such that said track and carriage run generally parallel to the lengthwise vector of a log when a log is held by said rotational mechanism, wherein said cutting mechanism comprises a vertical blade and a horizontal blade, wherein said vertical blade is generally oriented at a 90 degree angle to said horizontal blade, wherein said carriage is configured to travel along said track in a direction parallel to the lengthwise orientation of a log positioned in said rotational mechanism, wherein said blades are configured to cut said log as said carriage moves along said track, wherein said horizontal blade and said vertical blade are oriented to cut a board from said log exterior;

wherein said method comprises the step of cutting the exterior of said log from said board to obtain a generally square or rectangular board.

* * * * *